United States Patent
Chun et al.

(10) Patent No.: US 12,362,097 B2
(45) Date of Patent: Jul. 15, 2025

(54) METHOD OF PRODUCING CORE-SHELL PARTICLES AND MULTILAYER CERAMIC ELECTRONIC COMPONENT INCLUDING CORE-SHELL PARTICLES

(71) Applicant: SAMSUNG ELECTRO-MECHANICS CO., LTD., Suwon-si (KR)

(72) Inventors: Jin Sung Chun, Suwon-si (KR); Hae Suk Chung, Suwon-si (KR); Byung Sung Kang, Suwon-si (KR); Yun Jung Park, Suwon-si (KR); Young Hoon Song, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/992,463

(22) Filed: Nov. 22, 2022

(65) Prior Publication Data

US 2023/0093953 A1     Mar. 30, 2023

Related U.S. Application Data

(62) Division of application No. 16/864,728, filed on May 1, 2020, now Pat. No. 11,538,630.

(30) Foreign Application Priority Data

Nov. 27, 2019    (KR) .................... 10-2019-0154377

(51) Int. Cl.
*H01G 4/12*        (2006.01)
*C04B 35/626*    (2006.01)
(Continued)

(52) U.S. Cl.
CPC ..... *H01G 4/1218* (2013.01); *C04B 35/62665* (2013.01); *H01G 4/012* (2013.01); *H01G 4/30* (2013.01); *C04B 2235/783* (2013.01)

(58) Field of Classification Search
CPC ........ H01G 4/1218; H01G 4/012; H01G 4/30; C04B 35/62665; C04B 2235/783
(Continued)

(56) References Cited

U.S. PATENT DOCUMENTS

| 9,227,874 B2 | 1/2016 | Chatterjee |
| 2001/0021095 A1 | 9/2001 | Mizuno |

(Continued)

FOREIGN PATENT DOCUMENTS

| CN | 105967679 A | 9/2016 |
| JP | H10-270284 A | 10/1998 |

(Continued)

OTHER PUBLICATIONS

Office Action issued in corresponding Korean Patent Application No. 10-2019-0154377 issued Feb. 24, 2021, with English translation.
(Continued)

*Primary Examiner* — Arun Ramaswamy
(74) *Attorney, Agent, or Firm* — MORGAN, LEWIS & BOCKIUS LLP

(57) ABSTRACT

A method of producing a core-shell particle includes introducing a barium titanate-based base powder and an additive to a reactor, and exposing the barium titanate-based base powder and the additive to a thermal plasma torch to obtain core-shell particles including a core portion having barium titanate ($BaTiO_3$) and a shell portion including the additive and formed on a surface of the core portion.

8 Claims, 3 Drawing Sheets

(51) Int. Cl.
*H01G 4/012* (2006.01)
*H01G 4/30* (2006.01)

(58) Field of Classification Search
USPC ... 361/321.1, 321.2, 321.4, 321.5, 311, 320;
501/137
See application file for complete search history.

(56) References Cited

U.S. PATENT DOCUMENTS

| | | | |
|---|---|---|---|
| 2001/0055193 A1 | 12/2001 | Chazono | |
| 2007/0281160 A1* | 12/2007 | Krishna | B01D 69/02 427/212 |
| 2010/0014214 A1 | 1/2010 | Yamazaki | |
| 2011/0236575 A1* | 9/2011 | King | C23C 16/45555 118/712 |
| 2012/0057271 A1 | 3/2012 | Oh et al. | |
| 2013/0222968 A1 | 8/2013 | Koga | |
| 2014/0313634 A1* | 10/2014 | Yoon | H01G 4/30 501/137 |
| 2014/0342093 A1* | 11/2014 | Hadidi | B01J 2/02 427/446 |
| 2016/0251249 A1* | 9/2016 | Backhaus-Ricoult | C04B 35/195 428/116 |
| 2016/0268045 A1 | 9/2016 | Kaneko et al. | |
| 2017/0022608 A1* | 1/2017 | King | B22F 1/056 |
| 2019/0009330 A1* | 1/2019 | King | H01G 4/008 |

FOREIGN PATENT DOCUMENTS

| | | |
|---|---|---|
| KR | 10-2011-0003807 A | 1/2011 |
| KR | 10-2012-0023399 A | 3/2012 |
| KR | 10-2014-0049704 A | 4/2014 |
| KR | 10-2015-0025120 A | 3/2015 |
| KR | 10-2015-0063733 A | 6/2015 |

OTHER PUBLICATIONS

Soon-Mo Song et al., "The Effect of Uni-nanoadditive Manufactured Using RF Plasma Processing on Core-shell Structure in MLCC", Journal of the Korean Ceramic Society, vol. 46, No. 2, pp. 131-136, 2009.
Notice of Allowance issued in corresponding U.S. Appl. No. 16/864,728 dated Aug. 22, 2022.
Final Office Action issued in corresponding U.S. Appl. No. 16/864,728 dated Jun. 21, 2022.
Office Action issued in corresponding U.S. Appl. No. 16/864,728 dated Mar. 15, 2022.
Office Action issued in corresponding Chinese Patent Application No. 202010679433.X dated Apr. 10, 2024, with English translation.

* cited by examiner

I-I'

METHOD OF PRODUCING CORE-SHELL PARTICLES AND MULTILAYER CERAMIC ELECTRONIC COMPONENT INCLUDING CORE-SHELL PARTICLES

CROSS-REFERENCE TO RELATED APPLICATION(S)

This application is the divisional application of U.S. patent application Ser. No. 16/864,728 filed on May 1, 2020, which claims the benefit under 35 USC 119(a) of Korean Patent Application No. 10-2019-0154377 filed on Nov. 27, 2019 in the Korean Intellectual Property Office, the entire disclosures of which are incorporated herein by reference for all purposes.

TECHNICAL FIELD

The present disclosure relates to a method of producing core-shell particles and a multilayer ceramic electronic component including the core-shell particles.

BACKGROUND

As the trend for multifunctionalization, lightweightedness and miniaturization of electronic products is rapidly progressing, the necessity of small and high-performance electronic components is increasing, and demand for electronic components requiring high reliability, corresponding to electronics and industries such as automobiles and networks, is also greatly increased.

Accordingly, competition for technological development of passive components such as inductors, capacitors, and resistors to meet market demand is accelerating. In detail, multilayer ceramic capacitors are a representative field in which technological competition is fierce.

The multilayer ceramic capacitor is largely composed of a dielectric layer based on $BaTiO_3$ (BT), an internal electrode based on a metal, and an external electrode containing a metal (Cu) and glass, for capacitance implementation. Through developing high-capacitance products based on thinning of dielectric layers and internal electrodes and through improving reliability at high temperatures as well as high pressure, and moisture resistance, in addition to improved microstructures, many efforts are being made to secure the relevant market.

$BaTiO_3$ (BT) is one of the most important materials in manufacturing a high performance multilayer ceramic capacitor, and it is no exaggeration to say that the ceramic material determines most of the performance.

However, by the simple mixing method or heat treatment, which is the related art method of producing core-shell particles, since the uniformity of the particles decreases and the designated additive material is added by random coating, there is a problem in terms of the dispersion of the material and the distribution of products for the finished product.

Therefore, there is a need for research into a method of producing particles having a core-shell structure, capable of uniformly coating BT powder of a multilayer ceramic capacitor and an additive that determines the function thereof.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An aspect of the present disclosure is to provide a method of producing core-shell particles and a multilayer ceramic electronic component including the core-shell particles.

According to an aspect of the present disclosure, a method of producing a core-shell particle includes introducing a barium titanate-based base powder and an additive to a reactor, and exposing the barium titanate-based base powder and the additive to a thermal plasma torch to obtain a core-shell particle including a core portion having barium titanate ($BaTiO_3$) and a shell portion including the additive and formed on a surface of the core portion.

According to an aspect of the present disclosure, a multilayer ceramic electronic component includes a ceramic body including a dielectric layer, and internal electrode layers disposed to face each other with the dielectric layer interposed therebetween in the ceramic body. The dielectric layer includes a core-shell dielectric grain including a core portion having barium titanate ($BaTiO_3$) and a shell portion disposed on a surface of the core portion, and the core-shell dielectric grain is a core-multishell dielectric grain in which the shell portion has multiple layers.

BRIEF DESCRIPTION OF THE DRAWINGS

The above and other aspects, features, and advantages of the present disclosure will be more clearly understood from the following detailed description, taken in conjunction with the accompanying drawings, in which.

DETAILED DESCRIPTION

Figure 1:
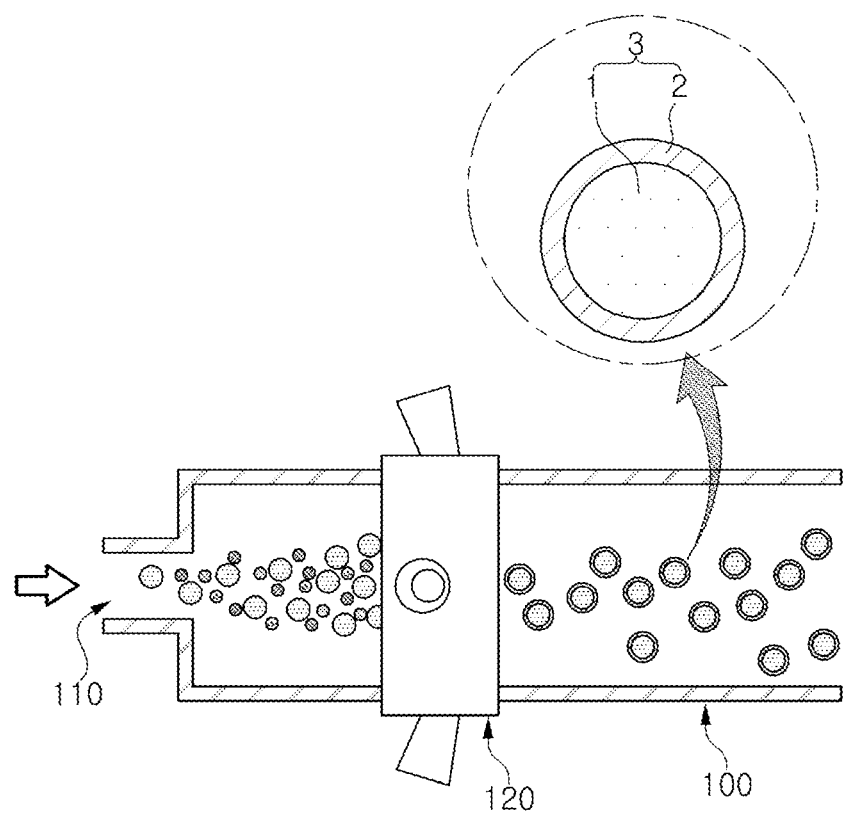
FIG. 1 is a flowing drawing illustrating a process of producing core-shell particles of a core-shell structure according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there may be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative size, proportions, and depiction of elements in the drawings may be exaggerated for clarity, illustration, and convenience.

Subsequently, examples are described in further detail with reference to the accompanying drawings.

FIG. 1 is a flowing drawing illustrating a process of producing core-shell particles of a core-shell structure according to an embodiment.

Referring to FIG. 1, a method of producing a core-shell particle includes introducing a barium titanate-based base powder and an additive to a reactor, exposing the barium titanate-based base powder and the additive to a thermal plasma torch, and obtaining core-shell particles including a core portion having barium titanate ($BaTiO_3$) and a shell portion including the additive. The shell portion is formed on a surface of the core portion by exposing the barium titanate-based base powder and the additive to the thermal plasma torch.

Hereinafter, a method of producing core-shell particles according to an embodiment will be described in detail for respective steps.

In the method of producing core-shell particles according to an embodiment, first, introducing the barium titanate-based base powder and the additive to a reactor 100 is performed.

According to an embodiment, unlike other embodiments to be described later, the barium titanate-based base powder and an additive may be introduced to the reactor 100 in the form of a mixture thereof.

When the mixture of the barium titanate-based base powder and the additive is added to the reactor 100, the mixture may be introduced to the reactor 100 through one feeder 110.

Next, exposing the barium titanate-based base powder and the additive to the thermal plasma torch 120 is performed.

By exposing the barium titanate-based base powder and the additive to the thermal plasma torch 120, only the barium titanate-based base powder surface is activated in a rapid heating and cooling manner ($>10^6$ K/s). In addition, velocity of the particles is 100~2,000 m/s.

The surface-activated barium titanate-based base powder and the additives present in the surroundings react with each other to form core-shell particles.

For example, according to an embodiment, the barium titanate-based powder and the additive are exposed to the thermal plasma torch 120 to obtain core-shell particles 3 including a core portion 1 including barium titanate ($BaTiO_3$) and a shell portion 2 including the additive and formed on the surface of the core portions 1.

In this case, the grain growth of the barium titanate-based base powder may be suppressed to maintain the uniformity of the particles, and the reaction time is relatively short to perform mass production and continuous production.

For example, according to an embodiment, core-shell particles for obtaining high performance and high reliability multilayer ceramic capacitors may be implemented by applying thermal plasma synthesis.

The thermal plasma torch 120 has a thermal plasma supply unit in a central portion thereof, and has a structure in which a torch is disposed around the center, and the structure thereof is not particularly limited thereto.

Figure 2:
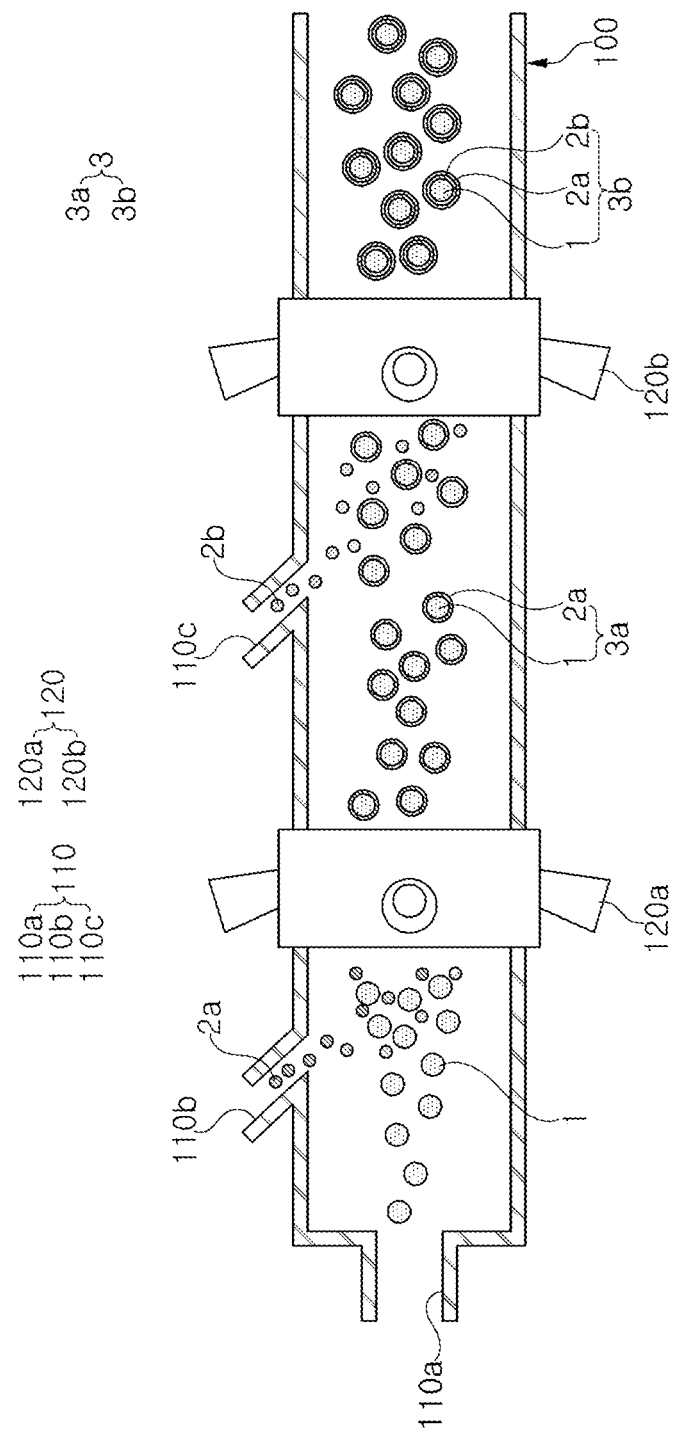
FIG. 2 is a particle flowing drawing illustrating a process of producing core-multishell particles of a core-shell structure according to another embodiment.

FIG. 2 is a particle flowing drawing illustrating a process of producing core-multishell particles of a core-shell structure according to another embodiment.

Figure 3:
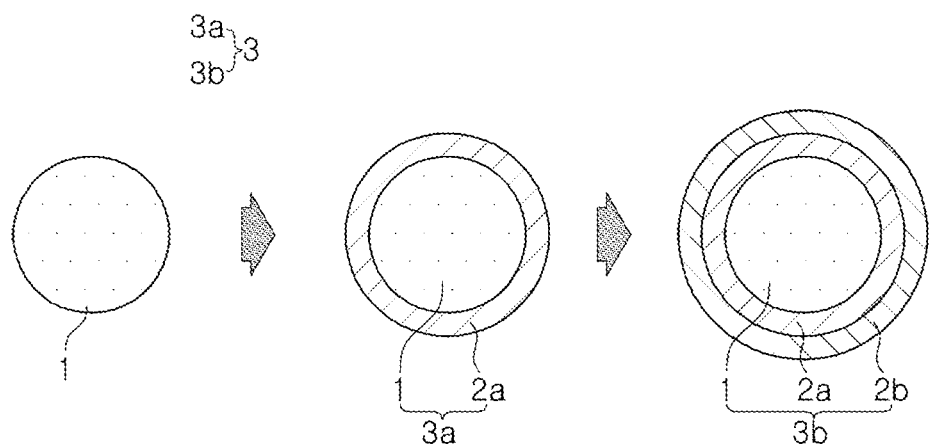
FIG. 3 is a schematic view illustrating core-multishell particles of the core-shell structure of FIG. 2.

FIG. 3 is a schematic view schematically illustrating core-multishell particles of the core-shell structure of FIG. 2.

A method of producing the core-shell particle 3 according to another embodiment includes introducing a barium titanate-based base powder 1 to the reactor 100 through a first feeder 110a and introducing a first additive 2a to the reactor 100 through a second feeder 110b, exposing the barium titanate-based base powder 1 and the first additive 2a to a first thermal plasma torch 120a to obtain first core-shell particles 3a, and introducing a second additive 2b to the reactor 100 through a third feeder 110c to be exposed to a second thermal plasma torch 120b together with the first core-shell particles 3a to obtain core-shell particles 3b. The second core-shell particles 3b have a core-multishell particle structure.

In the operation of adding the barium titanate-based base powder and the additive to the reactor, the barium titanate-based base powder and the additive may be separately added to the reactor through separate feeders.

Alternatively, a plurality of the feeder 110, fewer than or more than that shown in the drawings, and a plurality of the thermal plasma torch 120, fewer than or more than that shown in the drawings, may be disposed in the reactor 100.

In a method of producing the core-shell particles 3 according to another embodiment, first, the barium titanate-based base powder 1 is introduced into the reactor 100 through the first feeder 110a, and the first additive 2a is introduced into the reactor 100 through the second feeder 110b.

Another embodiment relates to a method of producing the core-shell particles 3 according to the selective individual-type thermal plasma synthesis method. In this case, the barium titanate-based base powder 1 is introduced to the reactor 100 through the first feeder 110a, and the first additive 2a is added to the reactor 100 through the second feeder 110b. Thus, an embodiment of the present disclosure is characterized by the barium titanate-based base powder 1 and the first additive 2a which are added to the reactor 100 through separate feeders.

Next, the barium titanate-based base powder and the first additive are exposed to the first thermal plasma torch 120a to obtain the first core-shell particles 3a.

By exposing the barium titanate-based base powder and the first additive to the first thermal plasma torch 120a, only the surface of the barium titanate-based base powder is activated in a rapid heating and cooling manner.

The surface-activated barium titanate-based base powder and the first additives present in the surroundings react with each other to form the first core-shell particles 3a.

For example, according to an embodiment, the barium titanate-based base powder and the first additive are exposed to the first thermal plasma torch 120a, thereby obtaining the first core-shell particle 3a that includes the core portion 1 including barium titanate ($BaTiO_3$) and the first shell portion 2a including the first additive and formed on the surface of the core portion 1.

Next, the second additive 2b is introduced into the reactor 100 through the third feeder 110c and exposed to the second thermal plasma torch 120b together with the first core-shell particles 3a, to obtain the second core-shell particles 3b.

For this reason, the second core-shell particles 3b have a core-multishell particle structure.

For example, the second core-shell particles 3b has a core-multishell particle structure that includes the core portion 1 including barium titanate ($BaTiO_3$), the first shell portion 2a having the first additive and formed on the surface of the core portion 1, and the second shell portion 2b including a second additive on the first shell portion 2a.

In detail, as illustrated in FIGS. 2 and 3, since the second core-shell particles 3b have a double shell structure, the second core-shell particles 3b may be referred to as core-double shell particles.

According to another embodiment, although not illustrated in FIGS. 2 and 3, additional additives in addition to the first and second additives may be further introduced into the reactor, and multiple shells including additional additives may be further formed on the second core-shell particles 3b.

For this reason, in the method of producing the core-shell particles 3 according to another embodiment, the produced core-shell particles 3 have a core-multishell particle structure, and the multishell may have a double shell or more.

For example, the core-shell particles 3 may include a shell layer of triple shell or more by further adding additional additives in addition to the first and second additives into the reactor as described above and exposing the additives to a further thermal plasma torch.

In the core-multishell particle structure, additives included in respective shell layers of the multishell may be different materials.

For example, as described above, the first additive and the second additive may be different materials, and therefore, the additives included in the first shell portion 2a and the second shell portion 2b may be different materials.

In addition, in the core-multishell particle structure, the additives included in respective shell layers of the multishell may have different concentrations.

For example, additives included in the first shell portion 2a and the second shell portion 2b may be different materials, and the additives included in the first shell portion 2a and the second shell portion 2b may have different measurement concentrations in respective shell portions.

In detail, although the first additive is mainly included in the first shell portion 2a, the first additive may also be detected in the shell portion of the second shell portion 2b or more, and in this case, the concentration of the first additive may be highest in the first shell portion 2a.

In addition, although the second additive is mainly included in the second shell portion 2b, the second additive may also be detected in the shell portions of the first shell portion 2a and the third shell portion or more, and in this case, the concentration of the second additive may be highest in the second shell portion 2b.

In the case of a simple mixing method or heat treatment, which is a related art method of producing core-shell particles, the uniformity of the particles is deteriorated, and since the designated additive material is added by random coating, there is a problem in the dispersion of the material, furthermore, in the product distribution for the finished product.

However, the core-shell particles produced by the core-shell particle production method by the thermal plasma synthesis method according to an embodiment of the present disclosure are relatively less aggregated and easier to synthesize ultra-fine particles than that in the related art methods.

In addition, the thermal plasma treatment effect is applied at the same time has the effect of sterilization and impurities removal.

In addition, when preparing the core-shell particles by thermal plasma synthesis method as in an embodiment, the core-shell particles may be produced only using the surface chemical reaction through the surface activation without causing BT grain growth, in a fast chemical reaction rate and rapid heating and cooling manner.

In addition, low vacuum synthesis and raw material injection in the axial direction enable mass production and continuous production.

In addition, the advantages in the case of the core-shell particle production method by the thermal plasma synthesis method according to an embodiment may be provided as follows.

Ultrafine particles having a narrow particle size distribution may be obtained depending on the production conditions. In addition, since the concentration of substances in the gas phase is relatively low, the aggregation of generated particles is small.

In addition, the number of chemicals involved is small and thus easy to control impurities, and the process is simpler and more widely used than the liquid phase method.

In addition, it is easy to control the synthetic atmosphere, and nonoxides such as nitrides, carbides, borides, and metals may be obtained in addition to oxides.

Volatile raw materials are easy to purify and high purity products may be obtained. A starting material may be freely selected in solid state, liquid state and gaseous state. In this case, fast chemical reaction properties of less than $10^{-2}$ sec. may be provided. It is possible for the short reaction time due to the rapid heating and cooling manner ($>10^6$ K/s). In addition, velocity of the particles, degree of vacuum, and power of plasma are 100~2,000 m/s, $10^{-2}$~$10^{-1}$, and 10~70 kW, repectively.

Figure 4:
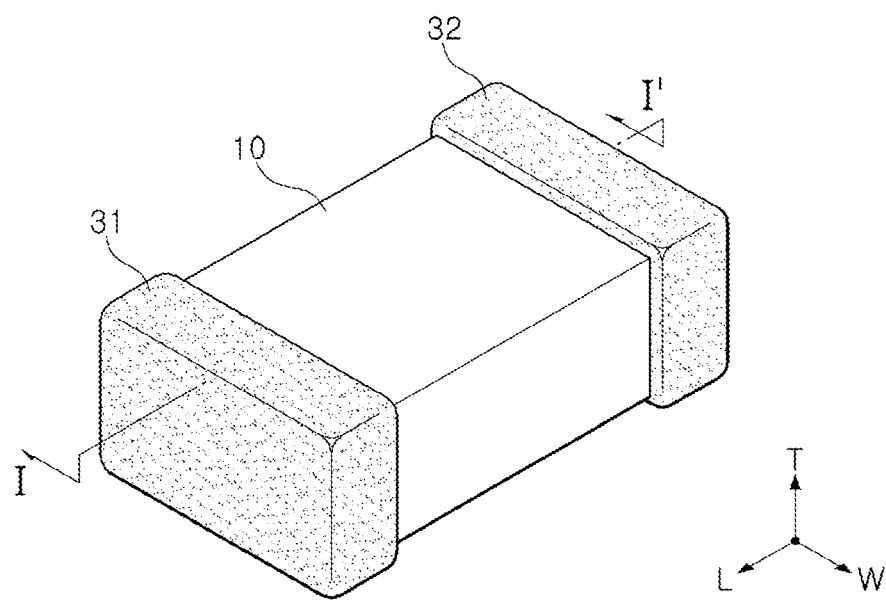
FIG. 4 is a perspective view schematically illustrating a multilayer ceramic capacitor according to another embodiment.

FIG. 4 is a perspective view schematically illustrating a multilayer ceramic capacitor according to an embodiment.

Figure 5:
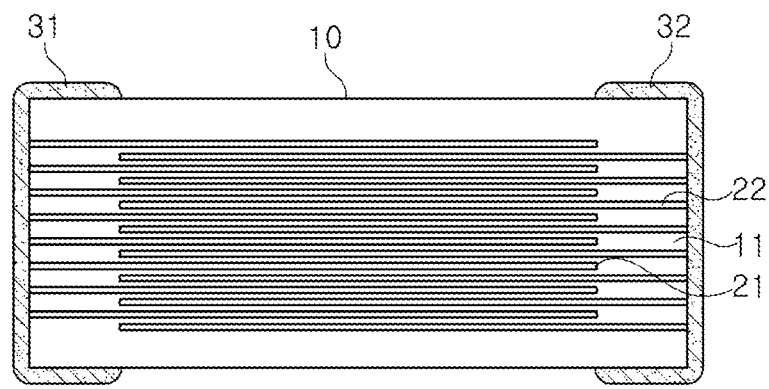
FIG. 5 is a cross-sectional view taken along line I-I' of FIG. 4.

FIG. 5 is a cross-sectional view taken along line I-I' of FIG. 4.

Referring to FIGS. 3 and 4, a multilayer ceramic electronic component according to another embodiment may include: a ceramic body 10 including a dielectric layer 11, and internal electrode layers 21 and 22 disposed to face each other in the ceramic body 10 with the dielectric layer 11 interposed therebetween. The dielectric layer 11 includes a core-shell dielectric grain 3 including a core portion 1 containing a barium titanate ($BaTiO_3$) and a shell portion 2 formed on the surface of the core portion 1, as described above. In the case of the core-shell dielectric grain 3, the shell portion 2 has multiple layers, as described above.

Hereinafter, a multilayer ceramic electronic component according to an embodiment will be described, and in detail, is described with a multilayer ceramic capacitor, but an embodiment thereof is not limited thereto.

In the multilayer ceramic capacitor according to an embodiment, 'length direction' is defined as 'L' direction of FIG. 4, 'width direction' as 'W' direction, and 'thickness direction' as 'T' direction. In this case, the 'thickness direction' may be used in the same concept as the direction of stacking the dielectric layer, for example, the 'stacking direction'.

According to an embodiment, the raw material for forming the dielectric layer 11 is not particularly limited as long as sufficient capacitance may be obtained, and may be, for example, barium titanate ($BaTiO_3$) powder as described above.

In the core-multishell dielectric grain, the multishell may include a shell layer of a double shell or more as described above.

In addition, in the core-multishell dielectric grain, the additives included in shell layers of the multishell structure may be different materials.

In addition, in the core-multishell dielectric grain, the additive included in the shell layers of the multishell may have different concentrations.

Other features are overlapped with the features of the method of producing the core-shell particles 3 according to the embodiment and the other embodiments described above, and thus will be omitted.

The material forming first and second internal electrodes 21 and 22 is not particularly limited, and for example, a conductive paste formed using one or more of, for example, silver (Ag), lead (Pb), platinum (Pt), nickel (Ni), and copper (Cu) may be used.

The multilayer ceramic capacitor according to an embodiment may further include a first external electrode 31 electrically connected to the first internal electrode 21 and a second external electrode 32 electrically connected to the second internal electrode 22.

The first and second external electrodes 31 and 32 may be electrically connected to the first and second internal electrodes 21 and 22 to form a capacitance, and the second external electrode 32 may be connected to a potential different from that of the first external electrode 31.

The material of the first and second external electrodes 31 and 32 is not particularly limited as long as the material may be electrically connected to the first and second internal electrodes 21 and 22 to form capacitance. For example, the first and second external electrodes 31 and 32 may include one or more selected from the group consisting of copper (Cu), nickel (Ni), silver (Ag), and silver-palladium (Ag—Pd).

As set forth above, according to embodiments, core-shell particles may be implemented to obtain high performance and high reliability multilayer ceramic capacitors by applying thermal plasma synthesis.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of producing a core-shell particle, comprising:

introducing a barium titanate-based base powder and an additive including one or more of Dy, Y, V, Mg, Mn, Ba, Si, Al, Cr, or Ca to a reactor; and exposing the barium titanate-based base powder and the additive to a thermal plasma torch to obtain a core-shell particle including a core portion having barium titanate ($BaTiO_3$) and a shell portion including the additive and formed on a surface of the core portion.

2. The method of claim 1, wherein the introducing of the barium titanate-based base powder and the additive to the reactor is performed by adding the barium titanate-based base powder and the additive in the form of a mixture to the reactor.

3. The method of claim 1, wherein the introducing of the barium titanate-based base powder and the additive to the reactor is performed by individually adding the barium titanate-based base powder and the additive to the reactor through separate feeders.

4. The method of claim 3, wherein in the reactor, the feeder and the thermal plasma torch are disposed in plural.

5. A method of producing a core-shell particle comprising:
adding barium titanate-based base powder to a reactor through a first feeder, and adding a first additive to the reactor through a second feeder;
exposing the barium titanate-based base powder and the first additive to a first thermal plasma torch to obtain a first core-shell particle;
introducing a second additive into the reactor through a third feeder; and
exposing the second additive together with the first core-shell particle to a second thermal plasma torch to obtain a second core-shell particle,
wherein the second core-shell particle has a core-multishell particle structure.

6. The method of claim 5, wherein in the core-multishell particle structure, the multishell comprises a shell layer of a double shell or more.

7. The method of claim 5, wherein in the core-multishell particle structure, the first and second additives included in shell layers of the multishell are different materials.

8. The method of claim 5, wherein in the core-multishell particle structure, the first and second additives included in shell layers of the multishell have different concentrations.

* * * * *